US008035482B2

(12) United States Patent
Kerr et al.

(10) Patent No.: US 8,035,482 B2
(45) Date of Patent: Oct. 11, 2011

(54) SYSTEM FOR UPDATING A CONTENT BEARING MEDIUM

(75) Inventors: Roger S. Kerr, Brockport, NY (US); Timothy J. Tredwell, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 1974 days.

(21) Appl. No.: 10/935,137

(22) Filed: Sep. 7, 2004

(65) Prior Publication Data

US 2006/0062096 A1    Mar. 23, 2006

(51) Int. Cl.
*H04Q 5/22* (2006.01)
(52) U.S. Cl. .................. 340/10.1; 340/13.26; 705/18
(58) Field of Classification Search ............ 340/10.1, 340/10.2, 10.3, 13.26; 705/18
See application file for complete search history.

(56) References Cited

U.S. PATENT DOCUMENTS

| | | | |
|---|---|---|---|
| 3,580,565 A | 5/1971 | Mallory et al. |
| 3,713,148 A | 1/1973 | Cardullo et al. |
| 3,835,301 A | 9/1974 | Barney |
| 4,075,018 A | 2/1978 | Custer |
| 4,129,855 A | 12/1978 | Rodrian |
| 4,178,183 A | 12/1979 | Ciurca, Jr. et al. |
| 4,208,210 A | 6/1980 | Sakai et al. |
| 4,247,758 A | 1/1981 | Rodrian |
| 4,270,853 A | 6/1981 | Hatada et al. |
| 4,270,854 A | 6/1981 | Stemme et al. |
| 4,600,280 A | 7/1986 | Clark |
| 4,663,625 A | 5/1987 | Yewen |
| 4,742,470 A | 5/1988 | Juengel |
| 4,806,958 A | 2/1989 | Momot et al. |
| 4,855,769 A | 8/1989 | Slavitter et al. |
| 4,880,325 A | 11/1989 | Ueda et al. |
| 4,905,029 A | 2/1990 | Kelley |
| 4,983,996 A | 1/1991 | Kinoshita |
| 4,990,092 A | 2/1991 | Cummings |
| 5,008,661 A | 4/1991 | Raj |

(Continued)

FOREIGN PATENT DOCUMENTS

EP        1 191 389 A    3/2002

(Continued)

OTHER PUBLICATIONS

Tag-it—Moving Concepts to Reality, Published by Texas Instruments, Dallas Texas, 2000.

(Continued)

*Primary Examiner* — Daniel Wu
*Assistant Examiner* — Rufus Point
(74) *Attorney, Agent, or Firm* — Roland R. Schindler

(57) ABSTRACT

The invention is directed to content bearing mediums having a capacity to receive additional content and systems and methods for updating and presenting content recorded on a content bearing medium, e.g., video cassette tape, CD or DVD, digital memory, game cartridges. In one aspect of the invention, a content bearing medium is provided. The content bearing medium has a content bearing signal stored thereon and a communication circuit. The communication circuit is adapted to exchange wireless signals with a remote programming device and to store an additional content bearing signal in a memory based upon the signals exchanged. The communication circuit is further adapted to transmit the additional content signals upon request by a player of the content bearing medium so that the player can receive the additional content signals and present an output that is based, at least in part, upon the stored signals.

15 Claims, 3 Drawing Sheets

U.S. PATENT DOCUMENTS

| | | |
|---|---|---|
| 5,019,815 A | 5/1991 | Lemelson et al. |
| 5,030,544 A | 7/1991 | Olbrechts et al. |
| 5,049,898 A | 9/1991 | Arthur et al. |
| 5,049,904 A | 9/1991 | Nakamura et al. |
| 5,059,126 A | 10/1991 | Kimball |
| 5,078,523 A | 1/1992 | McGourty et al. |
| 5,104,247 A | 4/1992 | Ohshima |
| 5,105,190 A | 4/1992 | Kip et al. |
| 5,184,152 A | 2/1993 | French |
| 5,185,315 A | 2/1993 | Sparer |
| 5,196,846 A | 3/1993 | Brockelsby et al. |
| 5,196,862 A | 3/1993 | Fisher, Sr. |
| 5,224,784 A | 7/1993 | Haftmann et al. |
| 5,266,968 A | 11/1993 | Stephenson |
| 5,266,975 A | 11/1993 | Mochizuki et al. |
| 5,268,708 A | 12/1993 | Harshbarger et al. |
| 5,290,190 A | 3/1994 | McClanahan |
| 5,297,881 A | 3/1994 | Ishiyama |
| 5,305,020 A | 4/1994 | Gibbons et al. |
| 5,310,999 A | 5/1994 | Claus et al. |
| 5,313,235 A | 5/1994 | Inoue et al. |
| 5,318,370 A | 6/1994 | Nehowig |
| 5,323,704 A | 6/1994 | Fraczek |
| 5,331,338 A | 7/1994 | Mager |
| 5,342,671 A | 8/1994 | Stephenson |
| 5,347,274 A | 9/1994 | Hassett |
| 5,365,312 A | 11/1994 | Hillmann et al. |
| 5,385,416 A | 1/1995 | Maekawa et al. |
| 5,398,257 A | 3/1995 | Groenteman |
| 5,426,011 A | 6/1995 | Stephenson |
| 5,430,441 A | 7/1995 | Bickley et al. |
| 5,455,617 A | 10/1995 | Stephenson et al. |
| 5,491,327 A | 2/1996 | Saroya |
| 5,491,468 A | 2/1996 | Everett et al. |
| 5,493,385 A | 2/1996 | Ng |
| 5,504,507 A | 4/1996 | Watrobski et al. |
| 5,513,920 A | 5/1996 | Whritenor et al. |
| 5,516,590 A | 5/1996 | Olmstead et al. |
| 5,521,663 A | 5/1996 | Norris, III |
| 5,528,222 A | 6/1996 | Moskowitz et al. |
| 5,528,377 A | 6/1996 | Hutcheson |
| 5,530,702 A | 6/1996 | Palmer et al. |
| 5,532,727 A | 7/1996 | Agano et al. |
| 5,537,920 A | 7/1996 | Hasegawa et al. |
| 5,547,501 A | 8/1996 | Maruyama et al. |
| 5,559,578 A | 9/1996 | Umeda et al. |
| 5,562,352 A | 10/1996 | Whritenor et al. |
| 5,565,906 A | 10/1996 | Schoon |
| 5,574,519 A | 11/1996 | Manico et al. |
| 5,584,070 A | 12/1996 | Harris et al. |
| 5,598,201 A | 1/1997 | Stodder et al. |
| 5,600,350 A | 2/1997 | Cobbs et al. |
| 5,600,352 A | 2/1997 | Knierim et al. |
| 5,606,347 A | 2/1997 | Simpson |
| 5,610,635 A | 3/1997 | Murray et al. |
| 5,613,190 A | 3/1997 | Hylton |
| 5,620,265 A | 4/1997 | Kondo |
| 5,625,391 A | 4/1997 | Hirabayashi et al. |
| 5,630,204 A | 5/1997 | Hylton et al. |
| 5,640,002 A | 6/1997 | Ruppert et al. |
| 5,644,557 A | 7/1997 | Akamine et al. |
| 5,647,679 A | 7/1997 | Green et al. |
| 5,652,838 A * | 7/1997 | Lovett et al. ............. 726/30 |
| 5,661,515 A | 8/1997 | Hevenor et al. |
| 5,713,288 A | 2/1998 | Frazzitta |
| 5,721,992 A | 2/1998 | Chovanes |
| 5,755,519 A | 5/1998 | Klinefelter |
| 5,757,021 A | 5/1998 | Dewaele |
| 5,757,394 A | 5/1998 | Gibson et al. |
| 5,768,633 A | 6/1998 | Allen et al. |
| 5,774,639 A | 6/1998 | Schildkraut et al. |
| 5,774,752 A | 6/1998 | Patton et al. |
| 5,793,413 A | 8/1998 | Hylton et al. |
| 5,812,156 A | 9/1998 | Bullock et al. |
| 5,842,118 A | 11/1998 | Wood, Jr. |
| 5,892,441 A | 4/1999 | Woolley et al. |
| 5,913,088 A | 6/1999 | Moghadam et al. |
| 5,914,671 A | 6/1999 | Tuttle |
| 6,075,950 A | 6/2000 | Stephenson |
| 6,099,178 A | 8/2000 | Spurr et al. |
| 6,106,166 A | 8/2000 | Spurr et al. |
| 6,173,119 B1 | 1/2001 | Manico et al. |
| 6,227,643 B1 | 5/2001 | Purcell et al. |
| 6,263,310 B1 | 7/2001 | Loudermilk |
| 6,282,819 B1 | 9/2001 | Gu |
| 6,359,842 B1 * | 3/2002 | Taguchi et al. ............. 369/14 |
| 6,491,217 B2 | 12/2002 | Catan |
| 6,512,919 B2 | 1/2003 | Ogasawara |
| 6,554,187 B2 | 4/2003 | Otto |
| 6,577,861 B2 | 6/2003 | Ogasawara |
| 6,795,404 B2 * | 9/2004 | Slemmer et al. ............. 370/270 |
| 6,809,779 B2 * | 10/2004 | Chang et al. ............. 348/734 |
| 6,816,415 B2 * | 11/2004 | Nakajima et al. ......... 365/189.14 |
| 6,868,292 B2 * | 3/2005 | Ficco et al. ............. 700/19 |
| 7,152,097 B1 * | 12/2006 | Allmark ............. 709/219 |
| 7,275,040 B2 * | 9/2007 | Forster et al. ............. 705/18 |
| 7,292,512 B2 * | 11/2007 | Ryal ............. 369/53.21 |
| 7,606,533 B2 * | 10/2009 | Perttila et al. ............. 455/41.2 |
| 2002/0029199 A1 * | 3/2002 | Go et al. ............. 705/51 |
| 2002/0031227 A1 * | 3/2002 | Milgram ............. 380/256 |
| 2002/0101619 A1 | 8/2002 | Tsubaki et al. |
| 2003/0107684 A1 * | 6/2003 | Chang et al. ............. 348/734 |
| 2003/0179606 A1 * | 9/2003 | Nakajima et al. ......... 365/189.01 |
| 2004/0044570 A1 * | 3/2004 | Aoyama ............. 705/14 |
| 2004/0187027 A1 * | 9/2004 | Chan ............. 713/201 |
| 2005/0050208 A1 * | 3/2005 | Chatani ............. 709/229 |
| 2006/0010201 A1 * | 1/2006 | Rothschild ............. 705/400 |
| 2006/0015752 A1 * | 1/2006 | Krueger ............. 713/193 |
| 2006/0290509 A1 * | 12/2006 | Forster et al. ............. 340/572.3 |
| 2007/0171772 A1 * | 7/2007 | Oshima et al. ............. 369/14 |
| 2008/0136592 A1 * | 6/2008 | Malik et al. ............. 340/10.1 |

FOREIGN PATENT DOCUMENTS

| | | |
|---|---|---|
| GB | 2 203 699 A | 10/1988 |
| JP | 06044265 | 7/1992 |
| NL | A 9400392 | 3/1994 |
| WO | WO 98/52762 | 11/1998 |

OTHER PUBLICATIONS

Making RFID work for you: An Industry Roundtable hosted by Texas Instruments at NACS-Tech 1998, Published by Texas Instruments, Dallas, Texas, 2000 www.ti.com/tiris/docs/manuals/whtPapers/white.pdf.

The Cutting Edge of RFID Technology and Applications for Manufacturing and Distribution, by d'Hont, Published by Texas Instruments, Dallas, Texas, 2000 www.ti.com/tiris/docs/manuals/whtPapers/manuf-dist-pdf.

TEMIC Semiconductors TK5550, Read/Write Transponder, Transponder, TELEFUNKEN Semiconductors, Rev. A1, Apr. 30, 1997.

TEMIC Semiconductors e5550, Standard Read/Write Identification IC, TELEFUNKEN Semiconductors, Rev. A3, Mar. 17, 1998.

ProxCard®II, Proximity Acces Card, HID Corp. An ASSA ABLOY Group Company, © 2001.

* cited by examiner

SYSTEM FOR UPDATING A CONTENT BEARING MEDIUM

CROSS REFERENCE TO RELATED APPLICATIONS

Reference is made to commonly assigned, co-pending U.S. patent application Ser. No. 10/161,514, entitled VIRTUAL ANNOTATION OF A RECORDING ON AN ARCHIVAL MEDIA, filed Sep. 9, 2002 in the names of Roger S. Kerr et al.

FIELD OF THE INVENTION

The invention relates to the field of content bearing mediums such as digital versatile disks, compact discs, video and audio tape cassettes, video game cartridges or solid state memories of the type that can be used, for example, to provide a stream of multimedia content for reproduction by a complementary designed player, and more particularly relates to a method and source of such multimedia content that enables remote updating of at least a portion of the content provided by such a content bearing medium.

BACKGROUND OF THE INVENTION

Content bearing mediums such as digital versatile discs, compact discs, video and audio tape cassettes, preprogrammed electronic memories such as memories of the type used in video game cartridges and the like are commonly used to store and transport relatively large compilations of prerecorded audio, video, and data signals that can be used to record content such as, movies, television programming, software, games, and data compilations. Such content bearing mediums provide an inexpensive and lightweight medium for conveying such large compilations. However, to conserve costs, the producers of content bearing mediums typically prepare such content bearing mediums in large batch processes. Frequently however, it can occur that after production of a batch of such content bearing mediums, it becomes advantageous to change or add to the content that has been recorded thereon.

There are a variety of reasons for which it may become desirable to adjust the content recorded on the content bearing mediums after the content has originally been stored thereon. For example, one popular form of recreational activity is to rent movies that are recorded on videocassettes or DVDs. The producers of such items often incorporate previews of other movies, advertising contest information, and promotions for other products and services onto rented items as a form of advertising. Digital versatile disc players typically present these previews in advance of the presentation of the main attraction. The intent of such presentations is to entice the renters of the currently presented item such as a DVD to rent the previewed attraction or to participate in the promotion. However, it will be appreciated that, as the rented item ages, the usefulness of the previewed presentation of the previewed is reduced. This can occur because the previewed attraction itself, may appear less relevant or less interesting. Accordingly, a valuable advertising opportunity is lost where the previewed attraction portion of the DVD is not up graded.

In particular, an example of the problems with renting aged items from a store, such as a video store, is that information concerning the product or manufacturer is out of date, i.e., ads and coupons have expired, contests have long since completed and movie previews, often referred to as trailers, are often quite old and are for movies the customer has already seen. Such old information is not only an inconvenience for the customer, who may often skip this information entirely, but also inconvenient to store owner who has lost an opportunity for further sales. Further, it is inconvenient for the customer to have to ask about any updated information upon rental or purchase of the video cassette, DVD or video game cartridge, and equally inconvenient for the retail clerk to have to retrieve and printout the information for the customer.

Similarly, it can arise after the content has been batch recorded on a plurality of content bearing mediums, last-minute changes, fixes, alterations, or supplements to the content may become necessary. However, the process for updating such content bearing mediums can be a difficult and expensive process. There are a variety of reasons for this. For example, many forms of content bearing mediums cannot be rewritten or can only be written/rewritten where the content is recorded on a rewritable form of medium. Typically, such rewriteable forms of medium are substantially more expensive than a non-rewriteable form of the same medium. Even where a rewritable medium is used, it can be difficult to incorporate previews having different running times and other characteristics onto a mediums without causing the entire medium to be rewritten which increases the time required to update content and the costs associated with doing so. Further, the characteristics of many types of rewriteable mediums can make it time consuming to rewrite content.

In many circumstances, the need to update content stored on a content bearing medium is not always apparent until after the content bearing medium has been packaged. For example, music, video and computer software content are often recorded on mediums that are packaged in a shrink-wrapped or theft deterrent packaging. At such a time, it becomes extremely expensive to unpackage the content, to rewrite content recorded on such mediums and to repackage the content.

In response to this, many types of software include an automatic update feature that causes the programmable device to automatically search on the Internet to determine whether such updates are necessary and to download these over the Internet where appropriate. A variety conditions can cause this process to fail. Accordingly, it is preferable to associate information from which such changes can be made with the medium before the first retail sale of the same.

Thus what is needed, is a cost-effective method for remotely adjusting for updating content recorded on a content bearing medium and a content bearing medium that is adapted to enable such adjustment.

There have been several attempts to remedy these drawbacks, such as shown in the U.S. Pat. No. 6,554,187 to Otto, which discloses a system of using an RFID label on a product from another store to develop pricing and promotional information regarding that product for the retailer and provide that information to the purchaser of the product. The system and method of Otto unfortunately provides information that may be desirable to the purchaser after a purchase has been made which is inconvenient for the purchaser who must decide whether to purchase the item (mostly at a reduced cost) and return the previously purchased same item to the place of purchase.

U.S. Pat. No. 5,892,441 to Woolley et al, which is hereby incorporated by reference, provides an extensive discussion of the use of single and multiple RFID labels on individual or bulk products to control the movement of the individual product or bulk products as well as develop inventory control information of the individual or bulk products. This system while providing extensive information to a product manufacturer, transporter and retailer, does not utilize the RFID labels to store information, such as recent movie trailers or product usage video, coupons, promotions and advertisements which can be given to the customer.

U.S. Pat. No. 6,491,217 to Catan, which is also hereby incorporated by reference, teaches a system and method of attaching RFID labels to receipts, such as movie stubs, which permits the user, at a kiosk, to rate the movie, view the movie maker's website to purchase items, such as a soundtrack, receive discount coupons to future movies or other free gift. The system and method of Catan, like that of Otto, requires the product (movie ticket) to be purchased before use and does not provide the user with the ability to easily view the latest movie trailers for the same movie or other movies.

U.S. Pat. Nos. 6,577,861 and 6,512,919 to Ogasawara, teach a system and method of bringing product information to a customer while shopping wherein a wireless telephone is used that has a bar code scanner attached thereto. The customer, upon entering the store, dials the store shopping service to receive a wireless download of the shopping program and the begins shopping by scanning the item's bar code label. The completion of the sale of the item is completed at a point of sale terminal using the product information stored in the cellular phone memory. While this service uses a bar code reader system, it does not provide the customer with the ability to be informed about video information available for the product to the customer.

Finally, U.S. Pat. Nos. 5,613,190, 5,793,413 and 5,630,204 to Hylton, disclose a system and method of delivering user selected video programming to a customer via a wireless transmitter and a plurality of receivers in a customer's home. While this system provide a customer with flexibility with regard to broadcast video programs and movies, the system does not provide the customer to seek viewing information from the product information on an RFID attached to the a video cassette, DVD or video game cartridge.

Therefore, there is still a need for a simpler, cost-effective system, device and method for updating a content bearing medium that can ease or eliminate the shortcomings of the prior art and the problems faced by the customer wishing to view the latest information regarding a product, i.e., movie trailers, product instructional use, promotional items, discount coupons or safety videos.

SUMMARY OF THE INVENTION

The invention is directed to content bearing mediums having a capacity to receive additional content and systems and methods for updating and presenting content recorded on a content bearing medium, e.g., video cassette tape, CD or DVD, digital memory, game cartridges. In one aspect of the invention, a content bearing medium is provided. The content bearing medium has a content bearing signal stored thereon and a communication circuit. The communication circuit is adapted to exchange wireless signals with a remote programming device and to store an additional content bearing signal in a memory based upon the signals exchanged. The communication circuit is further adapted to transmit the additional content signals upon request by a player of the content bearing medium so that the player can receive the additional content signals and present an output that is based, at least in part, upon the stored signals.

In another aspect of the invention, a player is provided for presenting a human perceptible output based upon content recorded on a content bearing medium. In accordance with this aspect of the invention the player has a first content signal reading circuit to receive content bearing signals from the content bearing medium and an additional reading circuit adapted to read a signal from a wireless communication circuit associated with the medium. The wireless communication circuit has a memory with an additional content signal stored therein. A content processing system generates a human perceptible output signal based at least in part upon the additional content signal.

In still another aspect of the invention, what is provided is a method of providing updated movie trailer information, coupon information, advertisements or promotional information to a video cassette, optical disk or electronic memory bearing a wireless communication circuit having a memory. In accordance with the method, a retailer database is updated with updated movie trailer information, coupon information, advertisements or promotional information; and a wireless communication circuit of a returned video cassette, optical disk or electronic memory is interrogated to determine the latest the movie trailer information, coupon information, advertisements or promotional information stored in the memory thereof and it is determined whether the trailer information, coupon information, advertisements or promotional information stored in the memory of the video cassette, optical disk or electronic memory matches the updated movie trailer information, coupon information, advertisements or promotional information stored in the retailer database. At any time prior to completion of the next rental of the video cassette, optical disk or electronic memory to a rentor, the updated movie trailer information, coupon information, advertisements or promotional information is retrieved and the updated movie trailer information, coupon information, advertisements or promotional information is stored in the memory of the radio frequency transponder so that the next renter of the video cassette, optical disk or electronic memory can observe the updated movie trailer information, coupon information, advertisements or promotional information.

In still another aspect of the invention, a system for updating information on a content bearing medium is provided. In accordance with method a content bearing medium having content signals stored thereon is provided and; a radio frequency communication circuit attached to the content bearing medium. The radio frequency communication circuit has a memory. A radio frequency transceiver generates a radio frequency signal from a remote location to the radio frequency communication circuit. The generated radio frequency signal is adapted with an additional content signal, the radio frequency circuit is adapted so that the radio frequency communication circuit stores the additional content signal in the memory. A display unit presents an output based upon the stored content signals and an information retrieving device attached to the display unit for retrieving the information from the memory and providing the additional content signals for use by the display unit. Wherein the radio frequency transceiver queries the radio frequency communication circuit to determine obtain information from which it can be determined whether the memory contains desired additional content and wherein the radio frequency transceiver transmits updated additional content when the memory does not already contain the desired additional content.

In yet another aspect of the invention, a system is provided for providing updated movie trailer information, coupon information, advertisements or promotional information to a video cassette, DVD or video game cartridge bearing an a radio frequency communication circuit having memory for storing the movie trailer information, coupon information, advertisements or promotional information. The system comprises a database containing updated movie trailer information, coupon information, advertisements or promotional information; and interrogator for activating the radio frequency communication circuit and interrogating the memory on the radio frequency communication circuit of a video cassette, DVD or video game cartridge. An evaluator determines whether the trailer information, coupon information, advertisements or promotional information stored on the radio frequency communication circuit of the video cassette, DVD or video game cartridge matches the updated movie trailer information, coupon information, advertisements or promotional information stored in the database. A radio-frequency transmitter transmits updated movie trailer information, coupon information, advertisements or promotional information to the radio frequency communication circuit for storage in the memory, at any time that the trailer information, coupon information, advertisements or promotional information stored on the memory does not match the updated movie trailer information, coupon information, advertisements or promotional information stored in the database. A display presents the updated movie trailer information, coupon information, advertisements or promotional information stored in the memory.

DETAILED DESCRIPTION OF THE INVENTION

Figure 1:
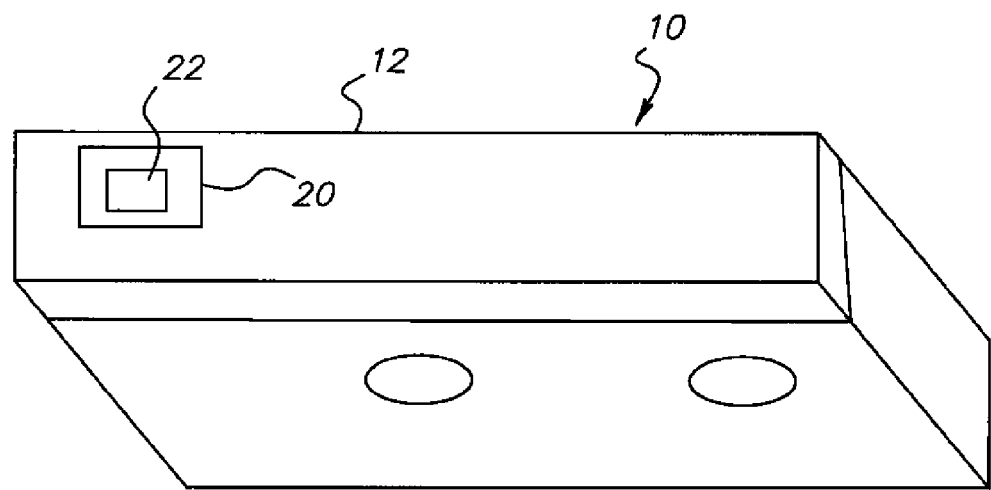
FIG. 1 illustrates one embodiment a content bearing medium of the invention.
Figure 2:
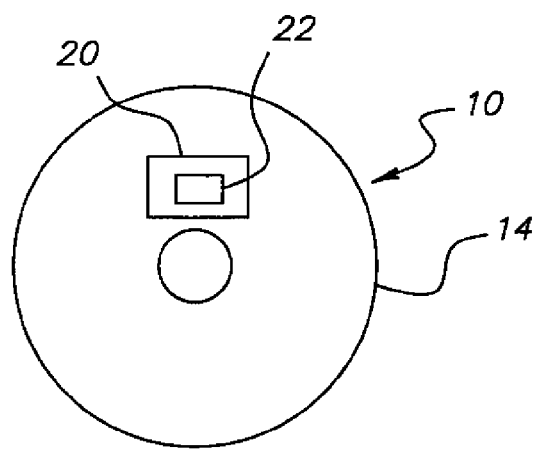
FIG. 2 illustrates another embodiment of a content bearing medium of the invention.
Figure 3:
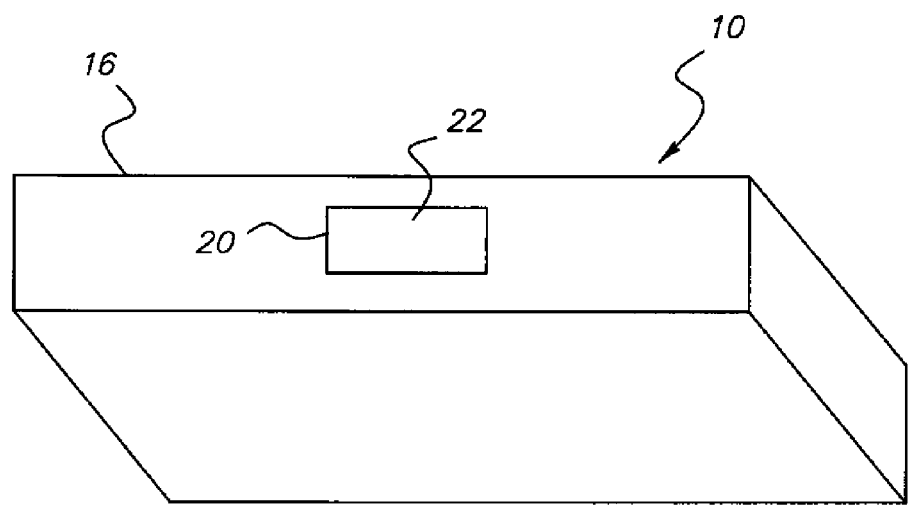
FIG. 3 illustrates yet another embodiment of a content bearing medium of the invention.

FIG. 1 illustrates one embodiment of a content bearing medium 10. In this embodiment, the content bearing medium 10 comprises a videotape cassette 12 having a communication circuit 20 with a memory 22. FIG. 2 illustrates another embodiment of a content bearing medium 10. In the embodiment shown in FIG. 2, the content bearing medium 10 comprises an optical recording medium 14 also having a communication circuit 20 with a memory 22 associated therewith. FIG. 3 illustrates yet another embodiment of a content bearing medium 10. In the embodiment of FIG. 3 content bearing medium 10 comprises an electronic memory device 16 such as a semi-conductor memory card or module, with predetermined content recorded therein. As is also shown in FIG. 3, electronic memory device 16 has a communication circuit 20 having a memory 22 associated therewith.

Communication circuit 20 can be associated with a content bearing medium 10 in a variety of ways. For example, the communication circuit 20 can be in the form of a label which can be affixed to content bearing medium 10 by way of an adhesive, fastener, or other conventional means. Alternatively, communication circuit 20 can be formed as a part of content bearing medium 10, for example, it can be incorporated into content bearing medium 10 during the manufacture or fabrication of the same. It will be appreciated that the location of the communication circuit 20 on content bearing medium 10 is not critical so long as logical association is preserved between the content bearing medium 10 and the communication circuit 20.

Communication circuit 20 is adapted to exchange wireless signals with a remote programming device. In one embodiment, wireless communication circuit 20 comprises a radio frequency circuit that is adapted to receive and transmit radio frequency signals. One example of such a radio frequency transmitter and receiver circuit is a radio frequency transponder. Other examples of such a radio frequency circuit include circuits that are adapted to communicate with other devices using, for example, the so-called Bluetooth communication scheme.

Another example of such a wireless communication circuit 20 is an optical transmitter and receiver circuit that is adapted to exchange information using at least one light sensor and light source. Wireless communication circuit 20 can also be adapted to communicate using electromagnetic signals that are within bands of the electromagnetic spectrum other than the optical or radio frequency bands.

Wireless communication circuit 20 has a memory 22 that is adapted to store an additional content bearing signal. In operation, wireless communication circuit 20 is adapted to receive signals containing an additional content bearing signal from a remote programming device and to store the additional content bearing signal in memory 22. In certain embodiments, wireless communication circuit 20 can be adapted to receive power for operation by extracting such power from electromagnetic or other signals transmitted wirelessly by a remote programming device or player.

Figure 4:
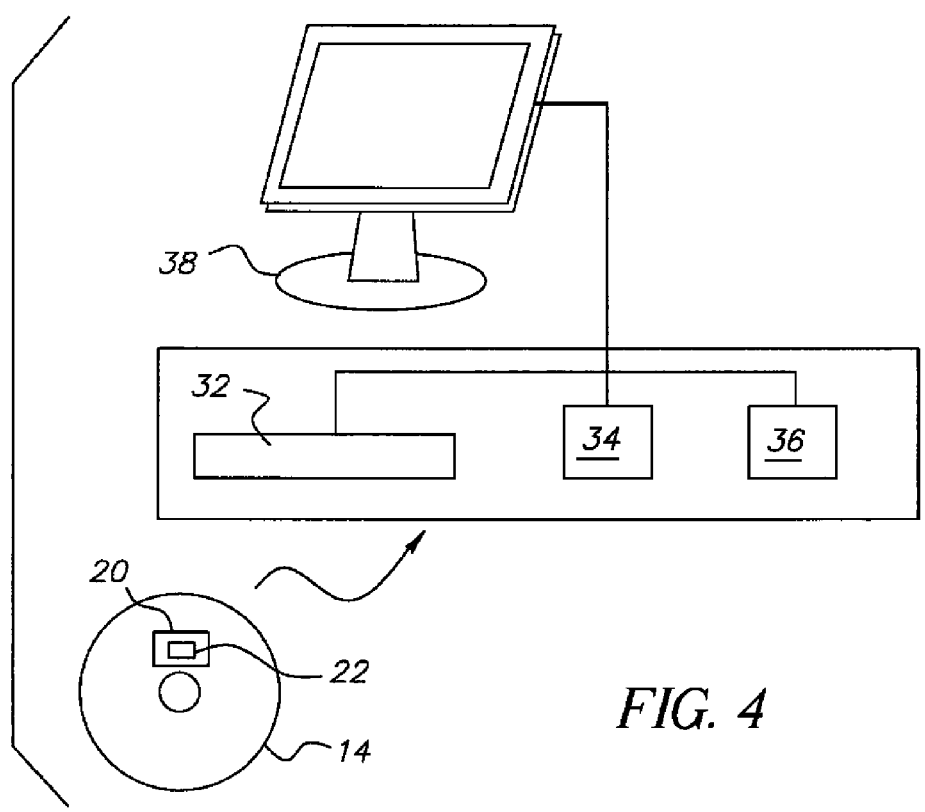
FIG. 4 illustrates an embodiment of a player for an embodiment of the content bearing medium of FIG. 2.

As is illustrated in FIG. 4, a player 30 is provided that has as a reader circuit 32 adapted to read content stored on optical recording medium 14 and wireless reader circuit 34, such as a radio frequency or optical transceiver, adapted to read the additional content bearing signal. Player 30 comprises a control system 36 to control the operation of reader circuit 32 and wireless reader circuit 34 and to cause a human perceptible output signal to be formed that is based at least in part upon the additional content signal. In certain modes of operation, the presented output can be based solely upon the additional content signal stored in memory 22 of wireless communication circuit 20, based solely upon the content recorded in the content bearing medium 10, or can be based upon some combination thereof. In the embodiment of FIG. 4, the human perceptible output signal can comprise information displayed on display 38. The presented information can comprise, for example information presented in a separate window on display 38 or in a same window that would display content recorded on the optical recording medium 14.

Figure 5:
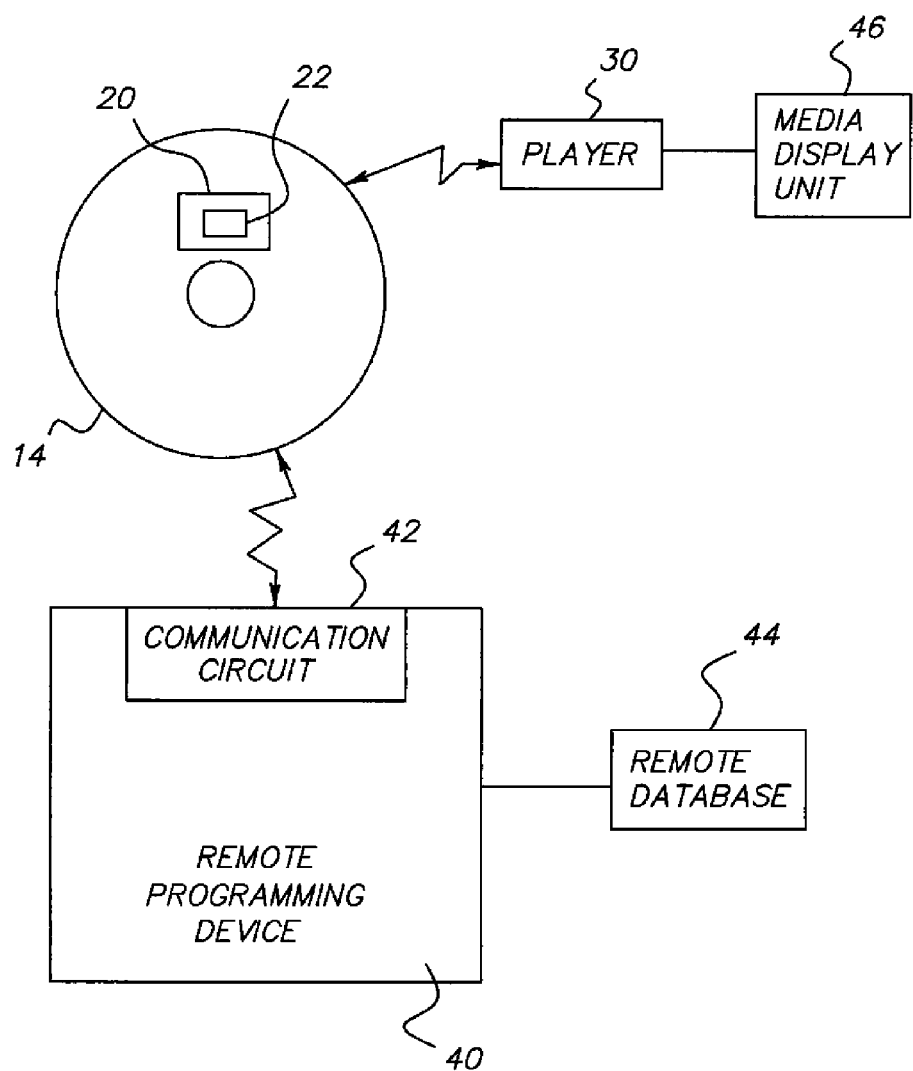
FIG. 5 illustrates a system for updating and retrieving content on a content bearing medium of FIG. 1.

The additional content bearing signal can take a variety of forms. For example, the additional content signal can be a video signal, an audio signal, or a data signal containing information that can be adapted for presentation by player 30. Alternatively, the additional content signal can contain data that directs player 30 to a location from which player 30 can obtain a video signal, an audio signal, or a data signal that can be presented by player 30. The former approach provides the advantage that information stored locally is more easily rapidly accessible to player 30 covered however this requires that memory 22 has substantial storage capacity which, and can be time-consuming to program and expensive to provide. The latter approach provides the advantage that the cost of memory 22 is lower while requiring that player 30 is adapted to obtain the content for other sources. Wireless reader circuit 34 can be incorporated into player 30 and shown in FIG. 4 or, as shown in FIG. 5, wireless reader circuit 34 can be separate from player 30 but connected thereto.

Since most content bearing mediums 10 such as videocassettes, compact discs, DVDs, and/or electronic memories having preprogrammed content such as conventional video game cartridges have promotional information, preview information and special event information that is recorded during recording of the content on the content bearing medium 10, such information quickly becomes dated and of little use to a viewer. However, in the present invention, such information can be recorded as additional content in the memory 22. Because memory 22 is of a rewritable type, such promotional, preview and special event information can be rewritten to memory 22 repeatedly over the life of the content bearing medium. Accordingly, the system of this invention provides greatly increased versatility in presenting such material to a viewer in that it allows a provider of such a content bearing medium to continually adjust and update the content that is associated with the content bearing medium.

In another aspect of the invention, it will be appreciated that, many forms of content bearing medium is 10 now contain signals with information that is used to program a player 30 such as DVD player, personal computer or video game with information that is executable by a programmable embodiment of control system 36. Occasionally, there will be errors in the programming data or other required updates to content that is stored on the content bearing medium after the content has been recorded on the content bearing medium 10. In this regard, the additional content stored in memory 22 can supplement, edit, or otherwise provide programming information that can be used by control system 36 so that control systems 36 can operate in a more efficient or effective or more reliable manner.

In order to update the additional content stored in memory 22, after initial additional content has been stored in memory 22, a remote programming device 40 has a transceiver or other communication circuit 42 to interrogate or send a query to the communication circuit 20 to determine what content is currently stored in memory 22. If the content currently stored in memory 22 matches a desired set of content stored for example in a remote database 44, then no updating is necessary. Such a situation could occur, for example, in a circumstance where a single videocassette is rented during an initial release of a motion picture recorded thereon. After the period of the initial release, however, remote programming device 40 can determine that the content stored in memory 22 requires updating with new different or additional content. Where such a determination is made, remote programming device 40 transmits a signal to communication circuit 20 instructing communication circuit 20 to replace, supplement or edit additional content stored in memory 22 with information transmitted by remote programming device 40. This transmission of such additional content can include, for example, updated promotional preview or special event information as described above. Alternatively, this updated information can include additional programming information. Such information can also be printed point-of-sale terminal for the customer's convenience.

Conveniently, the steps of determining whether content recorded in memory 22 is up to date and of updating this content can be performed in a contactless manner. Thus, in a conventional rental environment, such as a videodisc rental store, the step of updating can conducted using wireless means on a storewide, regional, classification based or individual based manner all without necessarily unpacking the document. For example, remote programming device 40 can be caused to transmit additional content that is to be recorded on all of the content bearing mediums within the store. Additionally, remote programming device 40 can be caused to transmit additional content that is selected based upon a genre, type, classification, or cast member of the content recorded content bearing medium. In this way, additional content related to a new comedy movie can be recorded in a memory 22 that is associated with a content bearing medium 10 having an older comedy movie recorded thereon. Alternatively, additional content related to particular character or actor can be stored in memory 22 that is associated with a content bearing medium 10 having content recorded thereon with such an actor in a prominent role.

Further, remote programming device 40 can be adapted to transmit information that is specifically addresses information that is particularly relevant to a particular consumer. Such consumer specific information can be determined based upon consumer profile information that is stored in a consumer database such as in remote database 44. For example, a consumer interest in a particular actor can be recorded in a profile and can cause content related to that particular actor to be stored as additional content in the memory 22. In this way, memory 22, can be adapted to store additional content that is tailored to the immediate needs of the store in general, particular titles within the store and/or the immediate interests of the consumer all with minimal labor cost and minimal delay in retailing or otherwise providing a content bearing medium 10 of the invention for use by a customer.

In order to reduce the number of updates of any content bearing medium 10, it is preferred that the updating process occur at the moment of rental or purchase of the content bearing medium 10, which will enable the retailer to inform the customer of any coupons or advertisements or promotions which may save the customer money, as well as inform the customer that the latest movie trailers are also available. Such information can be printed at the point of sale terminal for the customer's convenience.

That is, in certain embodiments, prior to completing the rental transaction, the communication circuit 20 be queried to determine whether memory 22 contains information that requires updating, a wireless network uploads the product information, i.e., last write event and content information, in memory 22 of the communication circuit 20 attached to the content bearing medium 10 and compares that information with the current information stored in the rental store database or the item manufacturer database. If selected items of information, such as video trailers, coupons, promotions or vendor advertisements, are not current, i.e., the date of the last write event does not match the current information, then the wireless network downloads that update information wirelessly to a memory 22.

In a retail environment, remote programming device 40 can be a portable unit or attached to a fixed structure such as an incoming security gate or point of sale terminal or free standing terminal. In one embodiment, the remote programming device 40 conventionally comprises a microprocessor coupled to a radio frequency transceiver, such as a spread spectrum RF transceiver adapted to communicate with a radio frequency type communication circuit 20, a communication port, an audible feedback device (not shown), a touchscreen or light pen or other media display 46, and optionally a printer and/or a magnetic stripe card reader and/or a smart card reader.

The invention has been described in detail with particular reference to certain preferred embodiments thereof, but it will be understood that variations and modifications can be effected within the spirit and scope of the invention.

That is, while the invention is described above with regard to video cassette, CD or DVD's, the invention can be applied to any displayable media device, such as portable personal computers using write/rewrite removable memory media, digital cameras, photographic printers. Further, while displayable media is preferred for the providing the updated information, audio devices for playing and/or recording audio can also be equipped with the information updating system of the instant invention. Such audio devices include, but not limited to, rewritable CD players and digital audio players, and the updating and playback process would be substantially the same, except for being limited to audio promotional, preview and special event information. The updating of the information retaining device would be via the RFID, interrogator, and retrieval devices described above and can occur during return of a rental or at some desired time determined by the user wishing to purchase additional audio content.

PARTS LIST 10 content bearing medium
12 video cassette
14 optical disk
16 electronic memory device
20 communication circuit
22 memory
30 player
32 reader circuit
34 wireless reader circuit
36 control system
38 display
40 remote programming device
42 remote programming device communication circuit
44 remote database
46 media display unit

The invention claimed is:

1. A content bearing medium comprising:
a medium having a first type of content bearing signal stored thereon that can be used by a player to generate a human perceptible output; and
a communication circuit adapted to exchange wireless signals with a remote programming device and to store an additional content bearing signal of the first type in a memory of the communication circuit based upon the signals exchanged;
said communication circuit further being adapted to transmit the additional content signal upon request by the player so that the player can receive the additional content signal from the communication circuit and can generate additional human perceptible output based, at least in part, upon the additional content signal by using the additional signal in the same way that the player uses the content bearing signal to generate the first output.

2. The content bearing medium of claim 1, wherein the communication circuit comprises a radio frequency circuit.

3. The content bearing medium of claim 1, wherein the communication circuit is adapted to convert the additional content signals into an optical signal that is readable by an optical reading circuit of a player of the content bearing medium.

4. The content bearing medium of claim 1, wherein the communication circuit comprises a circuit for converting the additional content signals into an electro-magnetic signal that is readable by an electromagnetic signal reading circuit of a player of the content bearing medium.

5. The content bearing medium of claim 1, wherein the memory is of a rewriteable type and wherein said communication circuit is adapted to write an additional content signal in the memory in place or in addition to previously stored additional content signal in the memory in response to signals from the remote programming device.

6. The content bearing medium of claim 1, wherein the additional content signals provide information that can be used to supplement the content recorded in the storage medium.

7. The content bearing medium of claim 1, wherein the content signals recorded on the content bearing medium has at least updatable portion and wherein the additional content signals contain update information.

8. The content bearing medium of claim 1, wherein the content signals recorded on the content bearing medium are adapted to provide predetermined applications for the additional content signal.

9. The content bearing medium of claim 1, wherein the communication circuit is adapted to extract power for operation from wireless signals received from the player.

10. A player for presenting a human perceptible output, the player comprising:
a first content signal reading circuit to read the content bearing signals of the first type from a content bearing medium;
an additional content reading circuit adapted to read a signal received from a wireless communication circuit associated with the medium, said wireless communication circuit having a memory with an additional content signal of the first type stored therein and incorporating the additional content signal in the signal that is received by the additional content reading circuit; and
a content processing system adapted to generate a human perceptible output signal based at least in part upon the additional content signal using a process that the player is also adapted to use to generate a human perceptible output signal based upon the content bearing signals recorded on the content bearing medium.

11. The player of claim 10, wherein the additional content signal provides information that is used by the content processing system to supplement the content on the content bearing medium.

12. The player of claim 10, wherein the content signals recorded on the content bearing medium contain updateable information, wherein the additional content signals contain update information and wherein the content processing system is adapted to present the content recorded on the content bearing medium in a manner that is updated in accordance with the update information.

13. The player of claim 10, wherein the additional content signals provide information from which a player of the content bearing medium can determine a remote location from which to obtain additional content and the player is adapted to read the additional content signals and to obtain further additional content from the remote location.

14. The player of claim 10, wherein the content signals recorded on the content bearing medium are adapted to provide predetermined applications for the content in the additional content signal, and
wherein the content processing system is adapted to present the content recorded on the content bearing medium so that the additional content signal is applied for the predetermined applications contained in the content signals recorded on the content bearing medium.

15. A system for updating information on a content bearing medium comprising:
a content bearing medium having content signals stored thereon;
a radio frequency communication circuit attached to the content bearing medium, said radio frequency communication circuit having a memory;
a radio frequency transceiver for generating a radio frequency signal from a remote location to the radio frequency communication circuit, said generated radio frequency signal being adapted with an additional content signal, said radio frequency circuit being adapted so that the radio frequency communication circuit stores the additional content signal in the memory;

a display unit for presenting an amount of an output on a display based upon the stored content signals of the first form; and an information retrieving device attached to the display unit obtaining the stored additional content signals from the memory and providing the additional content signals to the display unit in the first form so that the display unit can present more output using both the content signals on the medium and the additional content signals stored in the memory than is possible using the content signals stored on the medium alone;

wherein the radio frequency transceiver queries the radio frequency communication circuit to determine information from which it can be determined whether the memory contains desired additional content and wherein the radio frequency transceiver transmits updated additional content when the memory does not already contain the desired additional content.

* * * * *